United States Patent [19]

Masuda et al.

[11] Patent Number: 5,227,415
[45] Date of Patent: Jul. 13, 1993

[54] BIODEGRADABLE PLASTIC COMPOSITION

[75] Inventors: Takashi Masuda, Abiko; Akio Matsuda, Kashiwa; Kazuhisa Murata, Tsukuba; Shinsuke Yamazaki, Ibaraki, all of Japan

[73] Assignee: Director-General of Agency of Industrial Science and Technology, Japan

[21] Appl. No.: 668,153

[22] Filed: Mar. 12, 1991

[30] Foreign Application Priority Data

Apr. 6, 1990 [JP] Japan .................... 2-92816
Apr. 6, 1990 [JP] Japan .................... 2-92817

[51] Int. Cl.$^5$ .................. C08J 3/00; C08L 67/04; C08G 63/02; C08G 63/08
[52] U.S. Cl. ................................ 524/17; 524/18; 524/306; 524/315; 524/317; 528/354; 528/359
[58] Field of Search .............. 524/17, 18, 306, 315, 524/317; 562/553; 528/354, 359

[56] References Cited

U.S. PATENT DOCUMENTS

| | | | |
|---|---|---|---|
| 4,841,968 | 6/1989 | Dunn et al. | 606/231 |
| 4,863,472 | 9/1989 | Törmälä | 626/66 |
| 4,968,317 | 11/1990 | Törmälä | 606/76 |
| 5,076,983 | 12/1991 | Loomis et al. | 528/359 |

Primary Examiner—John Kight, III
Assistant Examiner—Jeffrey Culpeper Mullis
Attorney, Agent, or Firm—Lorusso & Loud

[57] ABSTRACT

A biodegradable plastic composition for use in production of shaped articles includes polyglycolide and a high molecular weight substance selected from poly(3-hydroxybutyric acid), a copolymer of 3-hydroxybutyric acid and 3-hydroxyvaleric acid, polycaprolactone, polyglutamic acid, polyolefin, polyvinyl alcohol, polyalkylene oxide, cellulose acetate and mixtures thereof, the amount of the polyglycolide being 5-60 % based on the total weight of the polyglycolide and the high molecular weight substance.

5 Claims, No Drawings

BIODEGRADABLE PLASTIC COMPOSITION

BACKGROUND OF THE INVENTION

This invention relates to a biodegradable plastic composition. More particularly, this invention relates to a biodegradable plastic composition containing polyglycolide and one or more specific high molecular weight substances.

Plastics are widely utilized in daily life as various shaped articles such as films, bags and containers. As the majority of plastics is not decomposed in natural environment, however, a serious problem of environmental destroy or pollution due to waste plastics has now been raised with increase in the amount of plastics used. For example, a movement of prohibiting or limiting the use of plastics as packaging materials is being encouraged in recent years in Europe and America. Accordingly, the development of plastics decomposable (biodegradable) by microorganisms or enzymes in the soil is now being carried out widely.

In the past, polyglycolide was known to be one of the biodegradable high molecular compounds. This compound has a high melting point and so is excellent in heat-resistance, but has high crystallinity and is brittle. Accordingly, this compound alone has not yet been used practically as a plastic material.

SUMMARY OF THE INVENTION

It is an object of the present invention to provide a biodegradable plastic composition practically useful as a material for shaped plastic articles.

In accordance with one aspect of the present invention, there is provided a biodegradable plastic composition comprising polyglycolide and a high molecular weight substance selected from the group consisting of poly(3-hydroxybutyric acid), a copolymer of 3-hydroxybutyric acid and 3-hydroxyvaleric acid, polycaprolactone, polyglutamic acid, polyolefin, polyvinyl alcohol, polyalkylene oxide, cellulose acetate and mixtures thereof, said polyglycolide being present in an amount of 5-60 % based on the total weight of said polyglycolide and said high molecular weight substance.

In another aspect, the present invention provides a shaped article obtained by a method comprising the steps of providing the above biodegradable plastic composition, heating said composition to a temperature sufficient to melt said composition, and molding said melted composition into a desired shape.

Other objects, features and advantages of the present invention will become apparent from the detailed description of the invention to follow.

DETAILED DESCRIPTION OF THE PREFERRED EMBODIMENTS OF THE INVENTION

The polyglycolide to used in the present invention as one of the constituents is a crystalline polymer obtained, for example, by heating glycolic acid, an ester thereof, sodium chloroacetate or glycolide (U.S. Pat. No. 2,585,427 issued to M. L. Beck; Chujo, K. et al, Makromolekulare Chem., 100, 262(1967); and Hirono, H. et al, Kogyo Kagaku Zasshi, 67, 604(1964)). Polyglycolide is advantageously prepared by reacting carbon monoxide with formaldehyde or paraformaldehyde in the presence of an acidic catalyst to form a polyglycolide (Masuda, T. et al, Japanese patent (Tokkyo Kokoku) No. 56-34,205) Very high molecular weight polyglycolide may be obtained by a method including the steps of adding water or a lower alcohol to ordinary polyglycolide to cause depolymerization reaction to form glycolic acid or a lower alcohol ester thereof, and heating, it to cause polymerization (U.S. Pat. No. 2,668,162 issued to C. E. Lowe). Such a high molecular weight polyglycolide is suitably used for the purpose of the present invention because of its excellent moldability. In the present invention, however, a polyglycolide having a relatively low molecular weight obtained by reacting carbon monoxide and formaldehyde in the presence of an acidic catalyst can also be used as the starting material. It is without saying that polyglycolides produced by any known methods other than those described above may be used for the purpose of the present invention. In general, a polyglycolide having a number average molecular weight higher than 500, preferably within the range from 800 to 200,000 can advantageously be used in the present invention.

The high molecular weight substances to be used in the present invention as the other constituent of the composition, i.e. the poly(3-hydroxybutyric acid), a copolymer of 3-hydroxybutyric acid and 3-hydroxyvaleric acid, polycaprolactone, polyglutamic acid, polyolefin, polyvinyl alcohol, polyalkylene oxide and cellulose acetate, are all commercially available. Accordingly, these commercially available high molecular weight substances can be used as such for the other constituent of the present invention.

The molecular weight of the high molecular weight substance varies with the kind of the substance but is generally in the range of 2,000–5,000,000, preferably 10,000–1,000,000. More particularly, in case poly(3-hydroxybutyric acid) is used, a preferable molecular weight is within the range of 20,000–1,000,000, more preferably 300,000–900,000. In case of a copolymer of 3-hydroxybutyric acid and 3-hydroxyvaleric acid, the proportion of both components is preferably within the range of 1:0.05 to 1:0.3 and the molecular weight thereof is preferably within the range of 10,000–1,000,000, more preferably 300,000–900,000. In case of polycaprolactone, the molecular weight is preferably within the range of 20,000–100,000, more preferably 30,000–60,000. In the case of polyglutamic acid, the molecular weight is preferably within the range of 20,000–80,000, more preferably 30,000–70,000. Illustrative of polyolefins suitably utilizable in the present invention are homopolymers of lower olefins and copolymers of lower olefins themselves or with other monomers, such as polyethylene, polypropylene, polybutylene, ethylene/propylene copolymer and ethylene/vinyl acetate copolymer. The molecular weight of the polyolefin used is preferably within the range of 20,000–1,000,000, more preferably 30,000–200,000. In case of polyvinyl alcohol, the preferable molecular weight is within the range of 15,000–100,000, more preferably 20,000–90,000. Illustrative of suitable polyalkylene oxides are polyethylene oxides, polypropylene oxides and the like lower polyalkylene oxides. The molecular weight of the polyalkylene oxide is preferably within the range of 2,000–5,000,000, more preferably 10,000–1,000,000. In case cellulose acetate is used in the present invention as the starting material, its molecular weight is preferably within the range of 10,000–200,000.

The molecular weights of polyglycolide and the high molecular weight substance are suitably selected according to the kind of the high molecular weight substance and the desired properties (biodegradability and moldability) of the composition. If the high molecular weight substance by itself shows poor moldability, the polyglycolide is desired to have a molecular weight of at least 20,000.

It is of interest that other various plastic substances such as polyvinyl chloride and polystyrene are extremely poor in blend performance with the polyglycolide, and a biodegradable plastic shaped article cannot be obtained practically from a blend of these substances and the polyglycolide.

The biodegradable plastic composition of this invention can easily be obtained by blending the polyglycolide with one or more of the high molecular weight substances under fusion. The resulting molten blend can then be processed by the aid of a conventional heat molding machine to manufacture molded articles of a desired shape. For example, a film of a desired thickness can be manufactured by hot calendering or extruding of the blend and a container of any desired shape can be manufactured by a conventional molding technique. Such articles may be of a foamed or non-foamed form. In case of manufacturing a foamed article, a proper amount of a foaming agent is incorporated into the plastic composition before molding. The plastic composition may further be incorporated with a proper amount of an inorganic filler, a pigment, an anti-oxidant and the like conventional auxiliary substances to such an extent that the inherent characteristic of the composition, e.g. biodegradability and mechanical property, may not seriously be damaged.

In the biodegradable plastic composition of this invention the proportion of the polyglycolide is specifically limited to 5–60 % by weight, preferably 10–50 % by weight based on the total amount of the polyglycolide and the high molecular weight substance. If the proportion of the polyglycolide is less than 5% by weight, the biodegradability of the composition will become poor. On the other hand, if the proportion of the polyglycolide is greater than 60% by weight, the composition will become so inferior in heat moldability that the mechanical properties of the resultant shaped article will be deteriorated.

The plastic composition of this invention which contains the polyglycolide possessing biodegradability (including hydrolytic property) has good biodegradability as a whole. Further, the composition has good moldability and is thus suitable as a biodegradable plastic molding material. Molded articles obtained from the plastic composition of this invention is not brittle as seen in polyglycolide and possess excellent flexibility and toughness.

Among the high molecular weight substances, polyvinyl alcohol, poly(3-hydroxybutyric acid), copolymers of 3-hydroxybutyric acid and 3-hydroxyvaleric acid, polycaprolactone, polyglutamic acid and cellulose acetate are themselves biodegradable. Thus, the biodegradable plastic compositions of this invention containing these high molecular weight substances can be used as an entirely biodegradable plastic molding material. Even when the biodegradable plastic composition contains polyolefin, a very high molecular weight polyalkylene oxide, or the like high molecular weight substance which, per se, is not biodegradable, the molded articles manufactured therefrom can significantly be reduced in their bulkness and disintegrated into fractions when left in the soil.

This invention will now be illustrated in more detail by way of example and comparative example.

EXAMPLE 1

In carbon monoxide atmosphere, a stainless steel autoclave was charged with 10.0 g of trioxane, 30 ml of dichloromethane and 4 mmol of chlorosulfonic acid. The autoclave was then charged with carbon monoxide under pressure until the inner pressure became 55 $kg/cm^2$, and the mixture was reacted together for 2 hours while stirring the mixture and elevating the temperature up to 180° C. After completion of the reaction, unreacted carbon monoxide was discharged and the content of the autoclave was washed out with acetone whereby 8.6 g of an acetone-insoluble polymer (polyglycolide having a molecular weight of about 1200 or higher) and 4.3 g of an acetone-soluble polymer (polyclycolide having a molecular weight less than about 1000) were obtained.

The acetone-soluble polymer in an amount 0.2 g was molten and blended with 0.8 g of poly(3-hydroxybutyric acid) having a molecular weight of about 500,000 and the resultant molten blend was pressurized through an extruder under pressure of 50 $kg/cm^2$ for 5 minutes at 150° C. whereby the polymer blend could be processed to a film, which was found to have a satisfactory flexibility.

The thus obtained film (4 cm×4 cm sample) was burried in the soil (depth: 5 cm) and left therein for 4 weeks at 23°–30 ° C. As a result, the film remaining in the soil was only about 6% of the original area.

EXAMPLE 2

The acetone-insoluble polymer in an amount of 0.5 g obtained in Example 1 was molten and blended with a copolymer of 3-hydroxybutyric acid and 3-hydroxyvaleric acid (molecular weight: ca. 15,000; the content of 3-hydroxyvaleric acid: 17%) and the resultant molten blend was processed to a film under the same condition as described in Example 1 whereby the resultant film was also found to have a satisfactory flexibility and biodegradability.

COMPARATIVE EXAMPLE 1

A film-shaping operation was carried out under the same condition as described in Example 1 except that polyvinyl chloride was used in place of 0.8 g of the poly(3-hydroxybutyric acid) described in Example 1. However, the polymer blend was extremely brittle and thus could not be processed to a film.

EXAMPLE 3

An experiment was carried out in the same manner as described in Example 1 except that 0.8 g of polyglutamic acid (molecular weight : about 50,000) was used in place of 0.8 g of he poly(3-hydroxybutyric acid) whereby a flexible, biodegradable film could be obtained.

COMPARATIVE EXAMPLE 2

An Experiment was carried out in the same manner as described in Example 2 except that 0.5 g of the acetone-insoluble polymer was blended with 0.5 g of polystyrene whereby a film could not be obtained.

EXAMPLE 4

An experiment was carried out in the same manner as described in Example 1 except that 0.5 g of the acetone-insoluble polymer nd 0.5 g of poly(ε-caprolactone) having a molecular weight of about 40,000 were used, and the resultant molten blend was subjected to a film-shaping operation as described in Example 1 under pressure of 50 kg/cm² for 5 minutes at 160° C. whereby a flexible, biodegradable film was obtained.

EXAMPLE 5

A film-shaping operation was carried out in the same manner as described Example 1 except that 0.2 g of the acetone-insoluble polymer and 0.8 g of a high density polyethylene were used, whereby the polymer blend could be processed to a film, which as found to have a satisfactory flexibility.

EXAMPLE 6

A film-shaping operation was carried out in the same manner as described in Example 5 except that 0.5 g of the acetone-insoluble polymer and 0.5 g of the high density polyethylene were used whereby the polymer blend could be processed to a film, which was found to have a satisfactory flexibility.

This film was subjected to a heat treatment in water or 1 hour at 100° C. whereby the film was hydrolyzed to reduce its weight by about 20% by weight.

EXAMPLE 3

A film-shaping operation was carried out in the same manner as described in Example 5 except that polyvinyl chloride was used in the same amount as described in Example 1 in place f the high density polyethylene. However, the polymer blend as extremely brittle and thus could not be processed to film.

EXAMPLE 7

A film-shaping operation was carried out in the same manner as described in Example 5 except that 0.8 g of polypropylene was used in place of 0.8 g of the high density polyethylene whereby a flexible film could be obtained.

COMPARATIVE EXAMPLE 4

A film-shaping operation was carried out in the same manner as described in Example 5 except that 0.5 g of acetone-insoluble polymer and 0.5 g of polystyrene were used whereby a film could not be obtained.

EXAMPLE 8

An experiment was carried out in the same manner as described in Example 5 except that 0.5 g of the acetone-insoluble polymer and 0.5 g of a polyethylene oxide (molecular weight: ca. 20,000) were used, and the resultant molten polymer lend was subjected to a film-forming operation in the same manner as described in Example 4 whereby a flexible, biodisintegrable film was obtained.

EXAMPLE 9

An experiment was carried out in the same manner as described in Example 5 except that 0.5 g of the acetone-insoluble polymer and 0.5 g of a polyvinyl alcohol (molecular weight: ca. 90,000) were used, and the resultant molten polymer blend was subjected to a film-shaping operation as described in Example 1 under pressure of 50 kg/cm² for 5 minutes at 130° C. whereby a flexible, biodegradable film was obtained.

EXAMPLE 10

An experiment was carried out in the same manner as described in Example 5 except that 0.5 g of the acetone-insoluble polymer and 0.5 g of cellulose acetate (polymerization degree: about 150) were used thereby a flexible, biodegradable film was obtained as well.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

What is claimed is:

1. A biodegradable plastic blend composition comprising polyglycolide having a number average molecular weight of 500–2000 and a high molecular weight substance selected from the group consisting of poly(3-hydroxybutyric acid) and a copolymer of 3-hydroxybutyric acid and 3-hydroxyvaleric acid, said polyglycolide being present in an amount of 5–60% based on the total weight of said polyglycolide and said high molecular weight substance.

2. A shaped article obtained by a method comprising the steps of providing a biodegradable plastic composition according to claim 1, heating said composition to a temperature sufficient to melt said composition, and molding said melted composition into a desired shape.

3. The composition as claimed in claim 1 wherein said high molecular weight substance is poly(3-hydroxybutyric acid).

4. The composition as claimed in claim 1 wherein said polyglycolide is present in the amount of 10–50% based on the total weight of said polyglycolide and said high molecular weight substance.

5. The composition as claimed in claim 3 wherein said polyglycolide is present in the amount of 10–50% based on the total weight of said polyglycolide and said high molecular weight substance.

* * * * *

UNITED STATES PATENT AND TRADEMARK OFFICE
CERTIFICATE OF CORRECTION

PATENT NO. : 5,227,415
DATED : July 13, 1993
INVENTOR(S) : MASUDA et al

It is certified that error appears in the above-indentified patent and that said Letters Patent is hereby corrected as shown below:

Col. 2, line 4, after "heating" delete the comma ",".

Col. 5, line 27, "EXAMPLE 3" should read --COMPARATIVE EXAMPLE 3--; and line 31, "f" should read --of--.

Signed and Sealed this

Fourteenth Day of June, 1994

Attest:

BRUCE LEHMAN

Attesting Officer

Commissioner of Patents and Trademarks